United States Patent
Tang

(10) Patent No.: US 8,604,759 B2
(45) Date of Patent: Dec. 10, 2013

(54) POWER REGULATION CIRCUIT AND ELECTRONIC DEVICE WITH THE SAME

(75) Inventor: Xing-Hua Tang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 274 days.

(21) Appl. No.: 13/189,603

(22) Filed: Jul. 25, 2011

(65) Prior Publication Data

US 2012/0256604 A1   Oct. 11, 2012

(30) Foreign Application Priority Data

Apr. 6, 2011   (CN) .......................... 2011 1 0085184

(51) Int. Cl.
*G05F 1/00* (2006.01)

(52) U.S. Cl.
USPC .......................................... 323/272; 323/268

(58) Field of Classification Search
USPC .......... 323/224, 266, 267, 269, 270, 272, 275
See application file for complete search history.

(56) References Cited

U.S. PATENT DOCUMENTS

| | | | | |
|---|---|---|---|---|
| 7,205,753 B2 * | 4/2007 | Chiu | ............................. | 323/283 |
| 7,786,714 B2 * | 8/2010 | Bacchi et al. | ................. | 323/282 |
| 7,839,189 B2 * | 11/2010 | Maltione et al. | .............. | 327/143 |
| 8,073,547 B2 * | 12/2011 | Hong et al. | ..................... | 607/57 |
| 8,212,539 B2 * | 7/2012 | Osaka | ............................ | 323/272 |
| 8,258,946 B2 * | 9/2012 | Chang | .......................... | 340/540 |
| 2010/0097828 A1 * | 4/2010 | Chen | .............................. | 363/72 |

* cited by examiner

*Primary Examiner* — Adolf Berhane
*Assistant Examiner* — Afework Demisse
(74) *Attorney, Agent, or Firm* — Altis Law Group, Inc.

(57) ABSTRACT

A power regulation circuit is connected to a voltage supply unit for receiving a power-on voltage supplied by the voltage supply unit and to a voltage management unit for enabling an enable port thereof. The power regulation circuit includes a first regulation unit and the second regulation unit. The first regulation unit is used for outputting an enable signal to the enable port when the power-on voltage is lower than a threshold value such that the voltage management unit can output a first working voltage to a load via a first output port thereof. The first regulation unit stops outputting the enable signal after the expiry of a certain period of time following the drop in a power supply to a level which is below a certain threshold value for a predetermined period.

20 Claims, 3 Drawing Sheets

POWER REGULATION CIRCUIT AND ELECTRONIC DEVICE WITH THE SAME

BACKGROUND

1. Technical Field

The present disclosure relates to a power regulation circuit and an electronic device having the power regulation circuit.

2. Description of Related Art

Many electronic devices include a voltage supply unit, such as a battery for supplying power to other components of the electronic devices. The energy stored in the battery is gradually consumed as the battery supplies power to the components. When the energy stored in the battery is almost exhausted, the voltage from the battery is too low to work the electronic device properly and the electronic device shuts down. However, the battery self recharges from its drained state after a period of time because of the characteristics of the battery, and the electronic device can be powered on again. However, the power in the revitalized battery may not maintain the voltage to work the electronic device properly, and the electronic device is shut down again. The electronic device thus changes between startups and shutdowns, which may confuse users and result in lost data.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
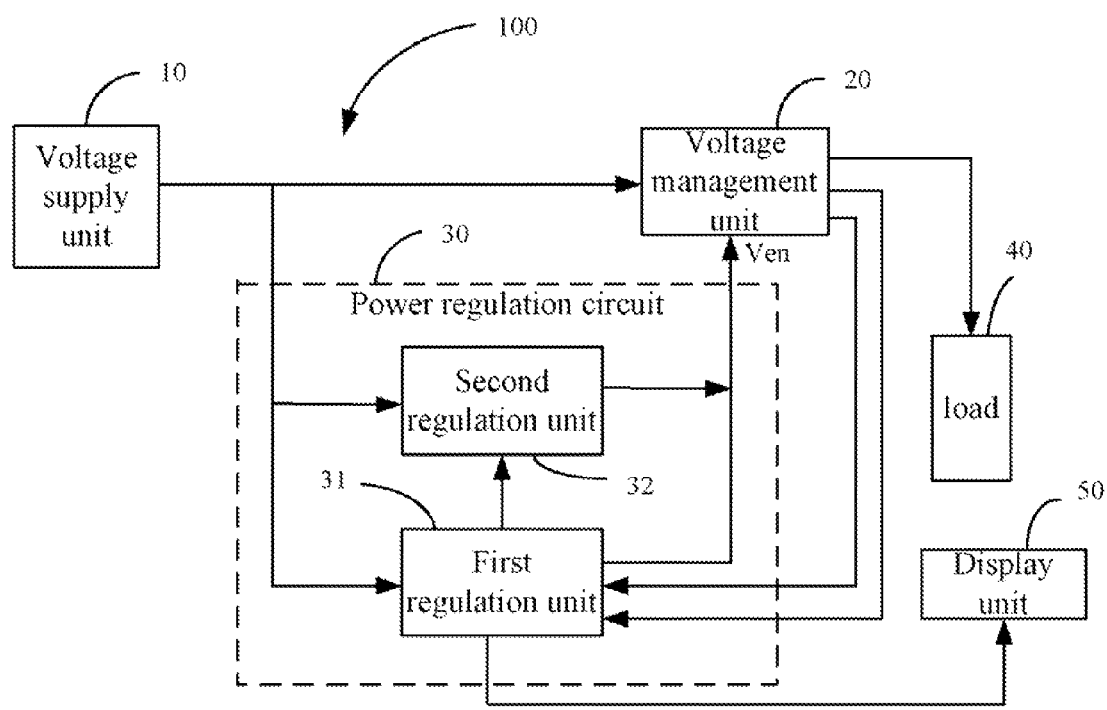
FIG. 1 is a block diagram of an electronic device according to an embodiment of the present disclosure.

Referring to FIG. 1, an electronic device 100 includes a voltage supply unit 10, a voltage management unit 20, a power regulation circuit 30, a load 40 and a display unit 50. The voltage supply unit 10 is used for supplying a power-on voltage to the voltage management unit 20 and the power regulation circuit 30. The voltage management unit 20 includes an enable port Ven. The power regulation circuit 30 is used for enabling and disabling the port Ven. The voltage management unit 20 outputs a plurality of working voltage to the load 40 and to the power regulation circuit 30 as the port Ven thereof is enabled. The load 40 represents the sum of the resistances of all the components of the electronic device 100. In some embodiments, the voltage supply unit 10 may be a Li-ion battery, and the port Ven is enabled when a high-level signal is received. The display unit 50 displays warning information when the battery is low.

The power regulation circuit 30 includes a first regulation unit 31 and a second regulation unit 32. The first regulation unit 31 is connected to the voltage supply unit 10, the port Ven of the voltage management unit 20, and the second regulation unit 32. The first regulation unit 31 outputs an enable signal to the port Ven when the power-on voltage from the voltage supply unit 10 is lower than a threshold value, for example, lower than 6V in the embodiment. The first regulation unit 31 is configured to cease outputting the enable signal after the power-on voltage has been lower than the threshold value for a predetermined period of time (predetermined period T). The second regulation unit 32 is connected to the voltage supply unit 20 and the enable port Ven. The second regulation unit 32 outputs the enable signal to the port Ven under the control of the first regulation unit 31 when the power-on voltage is higher than the threshold value.

Figure 2:
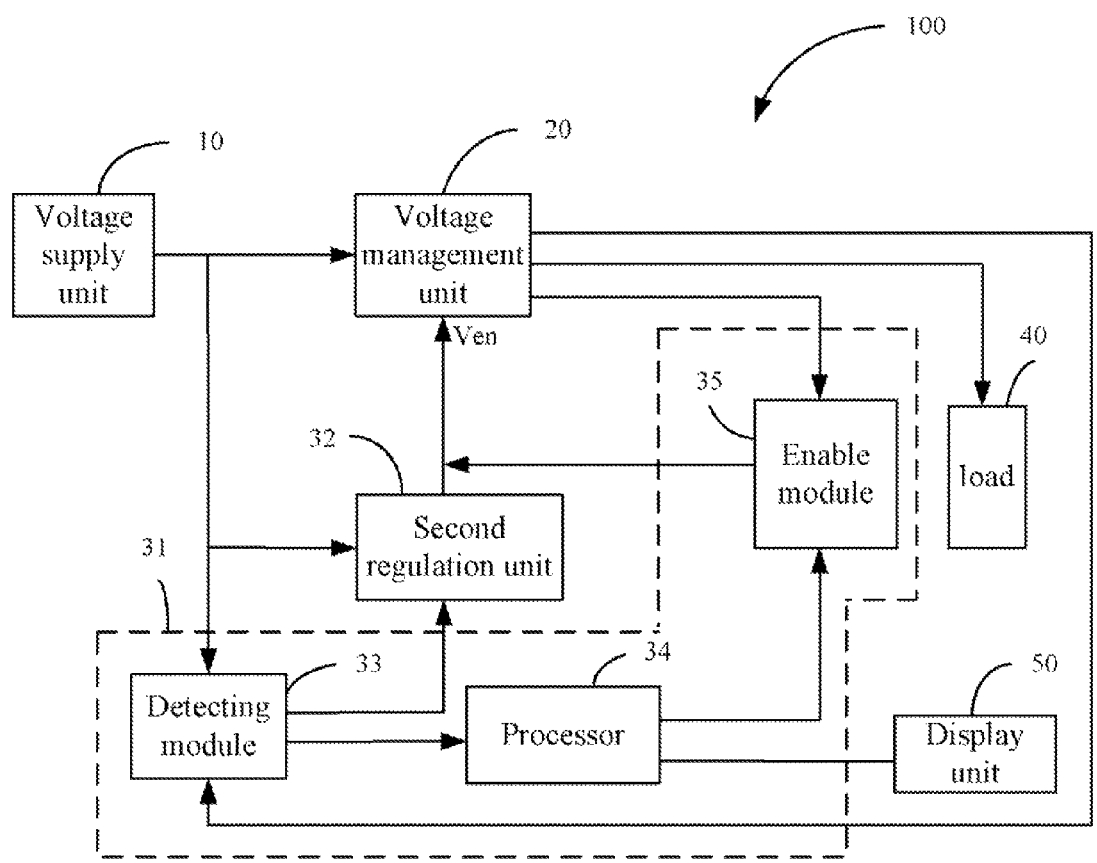
FIG. 2 is a functional block diagram of the electronic device of FIG. 1.

Referring to FIG. 2, <<In FIG. 1, you have two inputs and two outputs at the voltage management unit 20, in this figure you have three outputs and two inputs, please verify and correct. If going to two module in 31, maybe you want to show the split, if any, inside of the broken lines of 31.>> the first regulation unit 31 includes a detecting module 33, a processor 34, and an enable module 35. The detecting module 33 is connected to the voltage supply unit 10, the second regulation unit 32, the voltage management unit 20, and to the processor 34. The processor 34 is also connected to the enable module 35. The enable module 35 is also connected to the port Yen. When power-on voltage from the voltage supply unit 10 is lower than the threshold value, the detecting module 33 outputs a signal to the processor 34. The processor 34 outputs a control signal to the enable module 35 when receiving the signal from the detecting module 33. The enable module 35 outputs the enable signal to the enable port Ven when receiving the signal from the processor 34. If, the power-on voltage continues to be lower than the threshold value for the predetermined period T, the processor 34 stops outputting the control signal to the enable module 35, and the enable module 35 thus stops outputting the enable signal. In the embodiment, the signal from the detecting module 33 is a low-level signal recognized to be a logical "0" while the control signal is a high-level signal recognized as "1". The processor 34 does not output any signal to the enable module 35 when receiving either no signal or a high-level signal.

The processor 34 is also connected to the display unit 50 for outputting warning commands to the display unit 50 when the power-on voltage from the voltage supply unit 20 is lower than the threshold value, therefore low battery warnings can be given on the display unit 50.

Figure 3:
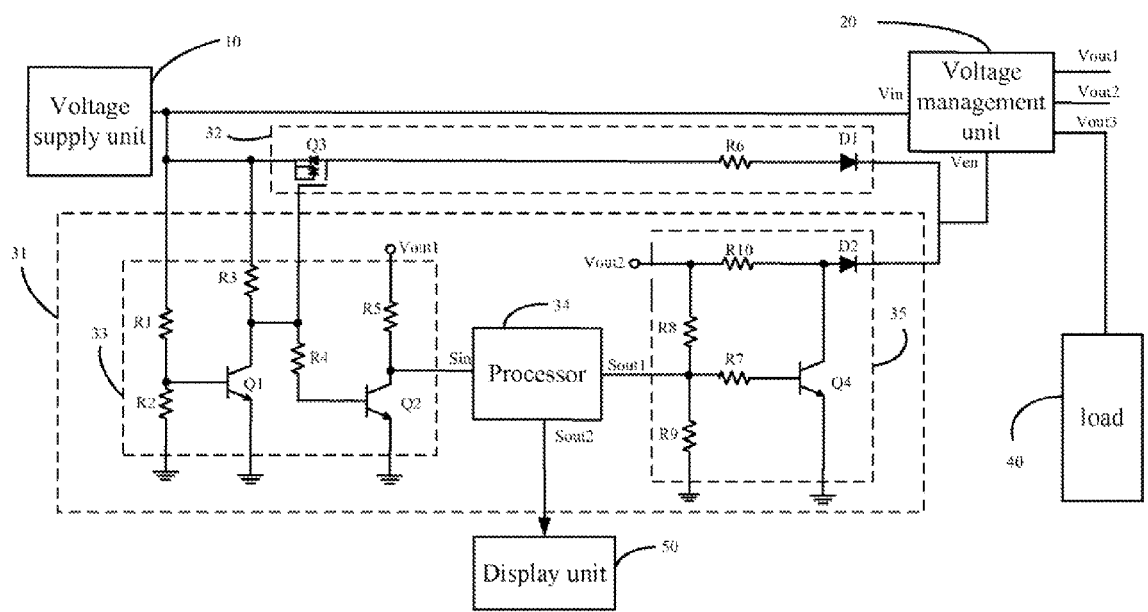
FIG. 3 is a circuit diagram of the power regulation circuit of FIG. 2.

Referring to FIG. 3, the voltage management unit 20 includes an input port Vin, the enable port Ven, three output ports Vout1, Vout2, and Vout3. The input port Vin is connected to the voltage supply unit 10 for receiving the power-on voltage. The output ports Vout1, Vout2, and Vout3 are used for respectively outputting a first working voltage, a second working voltage and a third working voltage.

The detecting module 33 includes transistors Q1, Q2, and resistors R1, R2, R3, R4, and R5. One end of the resistor R1 is connected to the voltage supply unit 10 and the other end is connected to ground via the resistor R2. The base of the transistor Q1 is connected to ground via the resistor R2, the collector thereof is connected to the voltage supply unit 10 via the resistor R3 and the emitter is connected to ground. The base of the transistor Q2 is connected to the collector of the transistor Q1 via the resistor R4, the collector is connected to the port Vout1 via the resistor R5 and the emitter is connected to ground. In the embodiment, the transistors Q1 and Q2 are an npn type bipolar junction transistors (BJT).

The second regulation unit 32 includes a transistor Q3, a resistor R6, and a diode D1. The source of the transistor Q3 is connected to the voltage supply unit 10, the gate thereof is connected to the collector of the transistor Q1. One end of the resistor R6 is connected to the drain of the transistor Q3 and the other end is connected to the anode of the diode D1. The cathode of the diode D1 is connected to the port Ven of the voltage management unit 20. In the embodiment, the transistor Q3 is an n-type enhanced mode metal oxide semiconductor field effect transistor (MOSFET).

The processor 34 includes an input port Sin and two output ports Sout1, Sout2. The input port Sin is connected to the collector of the transistor Q2, the output port Sout1 is connected to the enable module 35 while the output port Sout2 is connected to the display unit 50.

The enable module 35 includes a transistor Q4, resistors R7, R8, R9, R10, and a diode D2. One end of the resistor R7 is connected to the port Sout1 and the other end thereof is connected to the base of the collector Q4. One end of the resistor R8 is connected to the port Sout1 and the other end is connected to ground via the resistor R9. The collector of the transistor Q4 is connected to the anode of the diode D2 and the emitter is connected to ground. One end of the resistor R10 is connected to the port Vout2 and the other end is connected to the anode of the diode D2. The cathode of the diode D2 is connected to the port Ven.

A detailed description of the working process of the electronic device 100 follows.

When the energy stored in the voltage supply unit 20 is full or at least sufficient, the power-on voltage supplied from the voltage supply unit 20 is high. For example, the power-on voltage in this situation is higher than 6 volts. The power-on voltage is applied to the resistors R1 and R2. The voltage drop on the two ends of the resistor R2 is higher than the threshold voltage of the transistor Q1, the transistor Q1 thus turns on and connects the collector to the emitter and thus to ground. The gate of the transistor Q3 is also connected to ground through the collector of the transistor Q1. The transistor Q3 thus turns on. Therefore, the second regulation unit 32 outputs the control signal to the port Ven. The port Ven is enabled when receiving the enable signal and outputs three working voltages via the output ports Vout1, Vout2, and Vout3. For example, the port Vout1 outputs a first working voltage to the detecting module 33, the Vout2 outputs a second working voltage to the enable module 35, and the port Vout3 outputs a third working voltage to the load 40 which enables the electronic device 100 to work properly.

At this point, the transistor Q2 is off. Therefore, a high-level signal is output from the transistor Q2 to the port Sin of the processor 34. Since the high-level signal is not recognized by the port Sin, the processor 34 outputs no signal via the output port Sout1. Meanwhile, the second working voltage from the port Vout2 is applied to the resistors R8 and R9 to turn on the transistor Q4, thereby connecting the collector of the transistor Q4 to the emitter and thus to ground. The diode D2 thus is turned off and no enable signal is output from the second regulation unit 32 to the port Ven.

When the energy stored in the voltage supply unit 10 is exhausted, or almost exhausted, the power-on voltage supplied from the voltage supply unit 10 is low, for example, lower than the threshold value such as 6 volts in the embodiment. Since the voltage drop across the resistor R2 is now too low to turn on the transistor Q1, Q1 turns off. A high-level signal is then output to the gate of the transistor Q3 via the collector of the transistor Q1 to turn off the transistor Q3. The second regulation unit 32 thus stops outputting the enable signal to the enable port Ven of the voltage management unit 20.

Meanwhile, the transistor Q2 is turned on. A low-level detecting signal is output from the transistor Q2 to the port Sin of the processor 34. The processor 34 receives the detecting signal and outputs a low-level control signal to the transistor Q4 via the port Sout1. Also, the processor 34 outputs a warning command to the display unit 50 via the port Sout2. The transistor Q4 is turned off when the control signal is received. The enable module 35 thus outputs the enable signal to the port Ven via the resistor R10 and the diode D2.

On the expiry of the predetermined period T following the drop in voltage supplied from the voltage supply unit 10 to a level which is lower than the threshold value, a command is sent to the processor 34 and the processor 34 stops outputting the control signal. At this time, the second working voltage from the port Vout2 of the voltage management unit 20 turns the transistor Q4 on again and the enable module 35 stops outputting the enable signal to the port Ven. The enable port Ven is no longer enabled, and the voltage management unit 20 thus stops outputting the third working voltage to the load 40. The electronic device 100 then shuts down. Since the first regulation unit 31 will stop outputting the enable signal only after the expiry of the predetermined period T, users can make use of the time to save information. Additionally, in the predetermined period T, the energy stored in the voltage supply unit 10 continues to be consumed, further exhausting the battery and rendering it unable to startup the electronic device 100, the electronic device 100 is thus permanently shut down until the battery is recharged or replaced.

The port Ven in the embodiment continues to be in an enabled state for a preset predetermined interval after receiving the enable signal. Therefore, at the moment when the power-on voltage from the voltage supply unit 10 becomes lower than the threshold value, the enable port Ven is still in an enabled state. The working voltage can thus be maintained to the enable module 35 via the output port Vout2.

The threshold value of the power-on voltage can be adjusted by changing the threshold voltages of the transistors Q1 and Q3.

With the engagement between the first regulation unit 31 and second regulation unit 32, the power regulation circuit 30 can still enable the port Ven during the predetermined period T after the power-on voltage drops below the threshold value, continuing the operation of the electronic device 100. Additionally, the electronic device 100 is shut down only after the predetermined period T, and sudden and unexpected shutdowns where users have no time to save important information, and where the electronic device cycles between startups and shutdowns can be avoided.

It is to be understood, however, that even though the advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A power regulation circuit connected to a voltage supply unit and a voltage management unit, the power regulation circuit receiving a power-on voltage supplied by the voltage supply unit and outputting an enable signal to an enable port of the voltage management unit, the power regulation circuit comprising:

a first regulation unit for outputting the enable signal to the enable port when the power-on voltage is lower than a threshold value such that the voltage management unit can output a first working voltage to a load via a first output port thereof; the first regulation unit stop outputting the enable signal after the power-on voltage has been lower than threshold value for a predetermined period; and a second regulation unit for outputting the enable signal to the enable port under the control of the first regulation unit when the power-on voltage is higher than the threshold value.

2. The power regulation circuit as claimed in claim 1, wherein the first regulation unit comprises a detecting module connected to the voltage supply unit and the second regulation unit, an enable module connected to the enable port, and a processor connected to the detecting module and the enable module, the detecting module controls the output of the enable signal from the second regulation unit when the power-on voltage is higher than the threshold value and outputs a detecting signal when the power-on voltage is lower than the threshold value, the processor outputs a control signal when receiving the detecting signal, and the enable module outputs the enable signal to the enable port when receiving the control signal.

3. The power regulation circuit as claimed in claim 2, wherein the processor stops outputting the control signal after the detecting signal has been received for the predetermined period.

4. The power regulation circuit as claimed in claim 2, wherein the detecting module comprises a first transistor and a second transistor, the second regulation unit comprises a third transistor, the first transistor and the third transistor are on while the second transistor is off when the power-on voltage is higher than the threshold value, the second regulation unit outputs the enable signal when the third transistor is on; the first transistor turns off when the power-on voltage becomes lower than the threshold value to turn off the third transistor and turn on the second transistor, the second regulation unit stops outputting the enable signal as the third transistor turns off, and the detecting module outputs the detecting signal as the second transistor turns on.

5. The power regulation circuit as claimed in claim 4, wherein the voltage management unit comprises a second output port for outputting a second working voltage, the detecting module comprises a first resistor, a second resistor, and a third resistor, the voltage supply unit is connected to ground via the first resistor and the second resistor, the base of the first transistor is connected to ground via the second resistor, the emitter thereof is connected to ground and the collector thereof is connected to the voltage supply unit via the third resistor; the base of the second transistor is connected to the collector of the first transistor, and the collector thereof is connected to the processor and the second output port and the emitter thereof connected to ground.

6. The power regulation circuit as claimed in claim 5, wherein the source of the third transistor is connected to the voltage supply unit, the gate thereof is connected to the collector of the first transistor and the drain thereof is connected to the enable port of the voltage management unit.

7. The power regulation circuit as claimed in claim 4, wherein the enable module comprises a fourth transistor for receiving the control signal, the fourth transistor turns off when receiving the control signal, the enable module thus outputs the enable signal to the enable port; the fourth transistor turns on without receiving the control signal, the enable module thus stops outputting the enable signal.

8. The power regulation circuit as claimed in claim 7, wherein the voltage management unit comprises a third output port for outputting a third working voltage, the enable module further comprises a fourth resistor, a fifth resistor, and a sixth resistor, one end of the fourth resistor is connected to third output port and the other end thereof is connected to ground via the fifth resistor, one end of the sixth resistor is connected to the third output port and the other end thereof is connected to the enable port, the base of the fourth transistor is connected to processor, the emitter thereof is connected to ground and the collector thereof is connected to the sixth resistor, the base of the fourth transistor is connected to ground via the fifth resistor.

9. The power regulation circuit as claimed in claim 8, wherein the enable module comprises a first diode, the anode of the first diode is connected to the sixth resistor and the cathode thereof connected to the enable port, the second regulation unit further comprise a seventh resistor and a second diode, one end of the seventh resistor is connected to the drain of the first transistor and the other end thereof is connected to the anode of the first diode, the cathode of the second diode is connected to the enable port and the cathode of the first diode.

10. The power regulation circuit as claimed in claim 1, wherein the value of the enable signal is a constant value.

11. The power regulation circuit as claimed in claim 2, wherein the processor is connected to a display unit, the processor outputs at least one warning command to the display unit when receiving the detecting signal so that the display unit can display warning information about low battery of the voltage supply unit.

12. An electronic device, comprising:
a voltage supply unit for supplying a power-on voltage;
a voltage management unit connected to the voltage supply unit for outputting a first working voltage when receiving the power-on voltage, the voltage management unit further comprises an enable port and a first output port;
a load connected to the voltage management unit for receiving the first working voltage; and
a power regulation circuit connected to the voltage supply unit for receiving the power-on voltage and to the enable port for outputting an enable signal to enable the enable port, the power regulation circuit comprising:
a first regulation unit for outputting the enable signal to the enable port when the power-on voltage is lower than a threshold value such that the voltage management unit can output the first working voltage to the load via the first output port thereof, the first regulation unit stop outputting the first working voltage after the power-on voltage has been lower than a threshold value for a predetermined period; and
a second regulation unit for outputting the enable signal to the enable port under the control of the first regulation unit when the power-on voltage is higher than the threshold value;
wherein the value of the enable signal is a constant value.

13. The electronic device as claimed in claim 12, wherein the first regulation unit comprises a detecting module connected to the voltage supply unit and the second regulation unit, an enable module connected to the enable port, and a processor connected to the detecting module and the enable module, the detecting module controls the output of the enable signal from the second regulation unit when the power-on voltage is higher than the threshold value and outputs a detecting signal when the power-on voltage is lower than the threshold value, the processor outputs a control signal when receiving the detecting signal, and the enable module outputs the enable signal to the enable port when receiving the control signal.

14. The electronic device as claimed in claim 13, wherein the processor stops outputting the control signal after the detecting signal has been received for the predetermined period, the enable module stops outputting the enable signal to the enable port without receiving the control signal.

15. The electronic device as claimed in claim 13, wherein the detecting module comprises a first transistor and a second transistor, the second regulation unit comprises a third transistor, the first transistor and the third transistor are on while the second transistor is off when the power-on voltage is higher than the threshold value, the second regulation unit outputs the enable signal when the third transistor is on; the first transistor turns off when the power-on voltage becomes lower than the threshold value to turn off the third transistor and turn on the second transistor, the second regulation unit stops outputting the enable signal as the third transistor turns off, the detecting module outputs the detecting signal as the second transistor turns on.

16. The electronic device as claimed in claim 15, wherein the voltage management unit comprises a second output port for outputting a second working voltage, the detecting module comprises a first resistor, a second resistor, and a third resistor, the voltage supply unit is connected to ground via the first resistor and the second resistor, the base of the first transistor is connected to ground via the second resistor, the emitter thereof is connected to ground and the collector thereof is connected to the voltage supply unit via the third resistor; the base of the second transistor is connected to the collector of the first transistor, the collector thereof is connected to the processor and the second output port and the emitter thereof connected to ground.

17. The electronic device as claimed in claim 16, wherein the source of the third transistor is connected to the voltage supply unit, the gate thereof is connected to the collector of the first transistor and the drain thereof is connected to the enable port of the voltage management unit.

18. The electronic device as claimed in claim 13, wherein the enable module comprises a fourth transistor, the fourth transistor turns off when receiving the control signal, the enable module thus outputs the enable signal to the enable port; the fourth transistor turns on without receiving the control signal, the enable module thus stops outputting the enable signal.

19. The electronic device as claimed in claim 18, wherein the voltage management unit comprises a third output port for outputting a third working voltage, the enable module further comprises a fourth resistor, a fifth resistor, a sixth resistor, one end of the fourth resistor is connected to third output port and the other end thereof is connected to ground via the fifth resistor, one end of the sixth resistor is connected to the third output port and the other end thereof is connected to the enable port, the base of the fourth transistor is connected to the processor, the emitter thereof is connected to ground and the collector thereof is connected to anode of the sixth resistor and the enable port, the base of the fourth transistor is connected to ground via the fifth resistor.

20. The electronic device as claimed in claim 13, wherein the processor is connected to a display unit for outputting a warning command about low battery to the display unit when receiving the detecting signal.

\* \* \* \* \*